United States Patent
Noto

(10) Patent No.: US 9,581,238 B2
(45) Date of Patent: Feb. 28, 2017

(54) DEVICE AND METHOD FOR SWITCHING RANGE OF AUTOMATIC TRANSMISSION

(71) Applicant: HITACHI AUTOMOTIVE SYSTEMS, LTD., Hitachinaka-shi, Ibaraki (JP)

(72) Inventor: Yuji Noto, Isesaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 14/779,144

(22) PCT Filed: Mar. 12, 2014

(86) PCT No.: PCT/JP2014/056529
§ 371 (c)(1),
(2) Date: Sep. 22, 2015

(87) PCT Pub. No.: WO2014/156660
PCT Pub. Date: Oct. 2, 2014

(65) Prior Publication Data
US 2016/0053885 A1    Feb. 25, 2016

(30) Foreign Application Priority Data
Mar. 26, 2013  (JP) ................................. 2013-063342

(51) Int. Cl.
*F16H 63/38* (2006.01)
*F16H 59/08* (2006.01)
(Continued)

(52) U.S. Cl.
CPC ........... *F16H 59/08* (2013.01); *F16H 59/105* (2013.01); *F16H 61/0202* (2013.01); *F16H 63/38* (2013.01); *F16H 2059/086* (2013.01)

(58) Field of Classification Search
CPC .. F16H 59/08; F16H 59/105; F16H 2059/081; F16H 2059/086; F16H 63/38
See application file for complete search history.

(56) References Cited

U.S. PATENT DOCUMENTS

2002/0019287 A1  2/2002  Ebashi et al.
2006/0103339 A1  5/2006  Yamada et al.
(Continued)

FOREIGN PATENT DOCUMENTS

DE    10 2005 025 349 A1   6/2006
DE    60 2004 008 755 T2   6/2008
(Continued)

OTHER PUBLICATIONS

Japanese Office Action dated May 17, 2016 as issued in corresponding Japanese Application No. 2013-063342 and its English translation thereof.

*Primary Examiner* — Huan Le
(74) *Attorney, Agent, or Firm* — Foley & Lardner LLP

(57) ABSTRACT

A device for switching an automatic transmission range includes an actuator, a detent mechanism driven by the actuator and engageable with concave portions, and a control unit. The control unit sets first and second positions of the detent mechanism as first and second target values for positions corresponding to first and second transmission ranges. The first position is detected when the detent mechanism is driven to a limit position, is driven by a first predetermined amount, moves toward a valley of a first concave portion without being driven by the actuator, and then stops naturally. The second position is detected when the detent mechanism is driven by a second predetermined amount to move away from the first target value, move toward a valley of a second concave portion without being driven by the actuator, and then stop naturally.

13 Claims, 5 Drawing Sheets

(51) Int. Cl.
*F16H 59/10* (2006.01)
*F16H 61/02* (2006.01)

(56) References Cited

U.S. PATENT DOCUMENTS

2006/0207372 A1    9/2006  Mochizuki et al.
2006/0207373 A1*   9/2006  Amamiya ............... F16H 61/32
                                                  74/473.36
2012/0123653 A1    5/2012  Kimura et al.

FOREIGN PATENT DOCUMENTS

| DE | 10 2011 086 207 A1 | 5/2012 |
| JP | 2002-048230 A | 2/2002 |
| JP | 2004-308752 A | 11/2004 |
| JP | 2006-136035 A | 5/2006 |
| JP | 2006-260435 A | 9/2006 |
| JP | 2010-112524 A | 5/2010 |
| JP | 2012-107656 A | 6/2012 |

* cited by examiner

DEVICE AND METHOD FOR SWITCHING RANGE OF AUTOMATIC TRANSMISSION

TECHNICAL FIELD

The present invention relates to device and a method for switching the range of an automatic transmission that enable an actuator to switch the range of the automatic transmission, and specifically, to a technique for learning positions corresponding to the ranges.

BACKGROUND ART

In the related art, there is disclosed a device for switching the range of an automatic transmission which is provided with an electrically driven and controlled actuator and a range switching shaft that is positioned at angles corresponding to a plurality of ranges by a detent mechanism, and which enables the actuator to rotate the range switching shaft such that the range switching shaft switches between the plurality of ranges.

In this type of the range switching device, variations in the manufacturing or assembling of configuration components induce variations in the rotational angle of the range switching shaft, and thus the positioning accuracy and the responsiveness of range switching control based on a detected value of the rotational angle become worse.

In Patent Document 1, a range position is set in such a way that a limit position (the wall of a concave portion) of the operation range of a detent plate fixed to the range switching shaft, is learned as a reference position, and a rotation angle from the reference position to the range position is given as a fixed value.

REFERENCE DOCUMENT LIST

Patent Document

Patent Document 1: Japanese Patent Application Laid-Open No. 2004-308752

SUMMARY OF THE INVENTION

Problems to be Solved by the Invention

However, in the learning disclosed in Patent Document 1, variations in the limit position (the wall of a concave portion) and the range position (the valley of the concave portion) occur due to machining errors or the like, and thus the range position (an absolute value) is not capable of being accurately detected, and learning accuracy is not capable of being sufficiently improved.

Means for Solving the Problems

According to an aspect of the present invention, there is provided a device for switching the range of an automatic transmission including: an actuator; a detent mechanism which is driven by the actuator, and engaged with a concave portion formed at a position corresponding to a transmission range to be positioned, so that the detent mechanism changes the transmission range; and a control unit which sets a position of the detent mechanism as a target value for the position corresponding to the transmission range, the position of the detent mechanism being detected when the detent mechanism is driven to a limit position of the movement range of the detent mechanism, is driven by a predetermined amount so as to move away from the limit position, moves toward the valley of the concave portion, and then stops naturally, and which, when setting a target value for a position corresponding to another transmission range which is different from the transmission range of which a position is completely set, sets a position of the detent mechanism as a target value for the position corresponding to the another transmission range, the position of the detent mechanism being detected when the detent mechanism is driven by a predetermined amount so as to move away from the target value for the transmission range, the position of which is completely set, moves toward the valley of a concave portion corresponding to the another transmission range, and then stops naturally.

According to another aspect of the present invention, there is provided a method for switching the range of an automatic transmission, by which a detent mechanism is driven by an actuator, and engaged with a concave portion formed at a position corresponding to a transmission range to be positioned, so that a transmission range is changed, the method including: driving the detent mechanism to a limit position of the movement range of the detent mechanism, and driving the detent mechanism by a predetermined amount so as to move away from the limit position; setting a position of the detent mechanism as a target value for the position corresponding to the transmission range, the position of the detent mechanism being detected when the detent mechanism moves toward the valley of the concave portion and stops naturally; and when setting a target value for a position corresponding to another transmission range which is different from the transmission range of which a position is completely set, setting a position of the detent mechanism as a target value for the position corresponding to the differing transmission range, the position of the detent mechanism being detected when the detent mechanism is driven by a predetermined amount so as to move away from the transmission range, the position of which is completely set, moves toward the valley of a concave portion corresponding to the another transmission range, and then stops naturally.

Effects of the Invention

A detent mechanism is engaged in a natural state with a concave portion by being driven by a predetermined amount which is set from a limit position, and thus the detent mechanism is capable of being accurately positioned at a position corresponding to a transmission range, and the position corresponding to the transmission range is capable of being set with high accuracy. Accordingly, the positioning accuracy and the responsiveness of transmission range switching control are enhanced.

MODE FOR CARRYING OUT THE INVENTION

Hereinafter, an embodiment of the present invention will be described with reference to the accompanying drawings.

Figure 1:
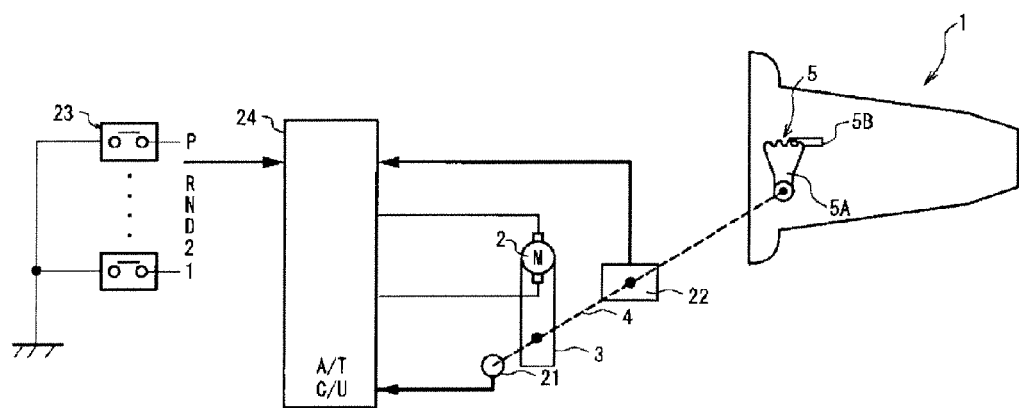
FIG. 1 is a diagram illustrating a system configuration of a device for switching the range of an automatic transmission.

FIG. 1 is a diagram illustrating a system configuration of a device for switching the range of an automatic transmission in the embodiment.

In FIG. 1, a motor (actuator) 2 for driving a range switching valve 6 (to be described later) is attached to an automatic transmission 1 mounted in a vehicle.

A reduction gear mechanism 3 is provided on an output shaft of motor 2, and motor 2 is configured to drive the rotation of a range switching shaft 4 via the reduction gear mechanism 3.

A predetermined amount of play in a rotational direction is formed in a connection portion in which the final stage of reduction gear mechanism 3 is spline-engaged with range switching shaft 4.

A detent mechanism 5 is attached to range switching shaft 4, and positions range switching shaft 4 at angles corresponding to a plurality of ranges.

Figure 2:
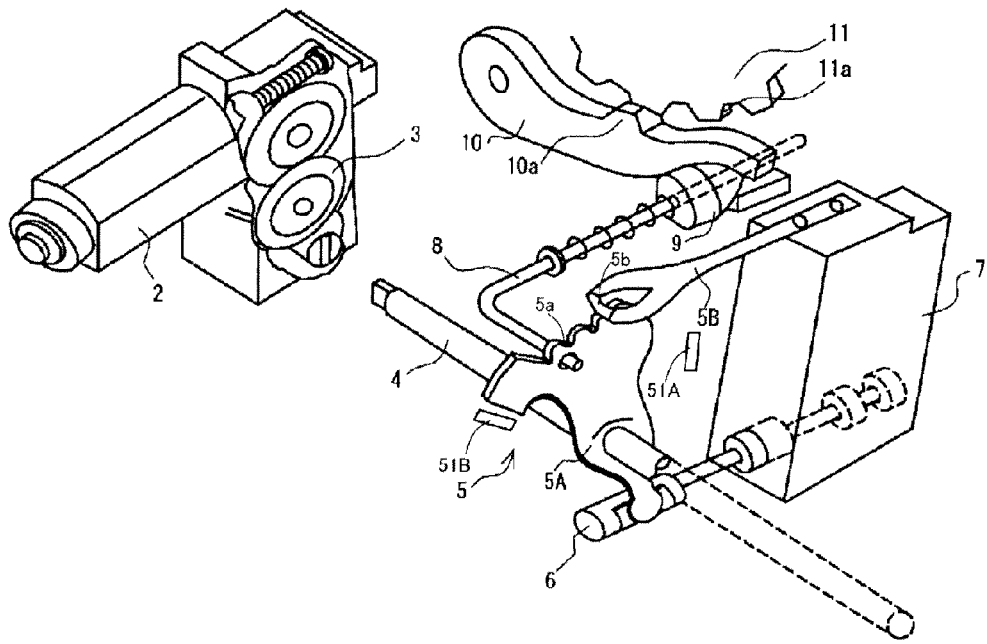
FIG. 2 is a perspective view illustrating a drive mechanism for a range switching shaft.

Detent mechanism 5 has a configuration illustrated in FIG. 2. A detent lever 5A is fixed to range switching shaft 4, and rotates integrally with range switching shaft 4. A detent spring 5B supports a roller 5b that is engaged with concave portions 5a which are formed in a circumferential edge of detent lever 5A to correspond to the ranges, and presses and biases roller 5b toward concave portions 5a.

Detent mechanism 5 with the aforementioned configuration positions range switching shaft 4 at an angle corresponding to any one of a P range (parking range), a R range (reverse range), a N range (neutral range), a D range (drive range), a second range, and a first range.

Stoppers 51A and 51B are provided on both sides of detent lever 5A in the rotational direction, and restrict the operation range of detent lever 5A.

A rotational motion of range switching shaft 4 is converted into an axial motion of range switching valve 6 due to engagement between detent lever 5A and range switching valve 6, and when range switching valve 6 is axially displaced in a valve body 7, hydraulic ports switch between open and closed states, and a line pressure is distributed according to each transmission range.

A cam 9 is attached to a end of a rod 8, the other end of which is attached to detent lever 5A, and a swingably supported parking pole 10 is driven such that parking pole 10 swings due to slide contact between parking pole 10 and cam 9. In the P range position, a pawl 10a of parking pole 10 meshes with a concave portion 11a of a parking gear 11 such that parking gear 11 is fixed.

Range switching shaft 4 includes a potentiometer 21 that continuously detects the angle of range switching shaft 4, and is provided with an inhibitor switch 22 that detects any one of the ranges to which automatic transmission 1 is switched.

A range selector switch 23 operated by a driver is provided.

An A/T control unit (A/T C/U) 24 receives signals from potentiometer 21, inhibitor switch 22, and range selector switch 23.

A/T control unit 24 controls the drive of motor 2 according to a command for switching the range which is determined based on an input from range selector switch 23. Range switching control will be described later.

A/T control unit 24 has a function of setting the position (target angle for each range) of range switching shaft 4 for the corresponding range through learning so as to compensate for a deviation in a detection angle acquired by potentiometer 21. Learning control will be described with reference to the flowchart in FIG. 3.

Figure 3:
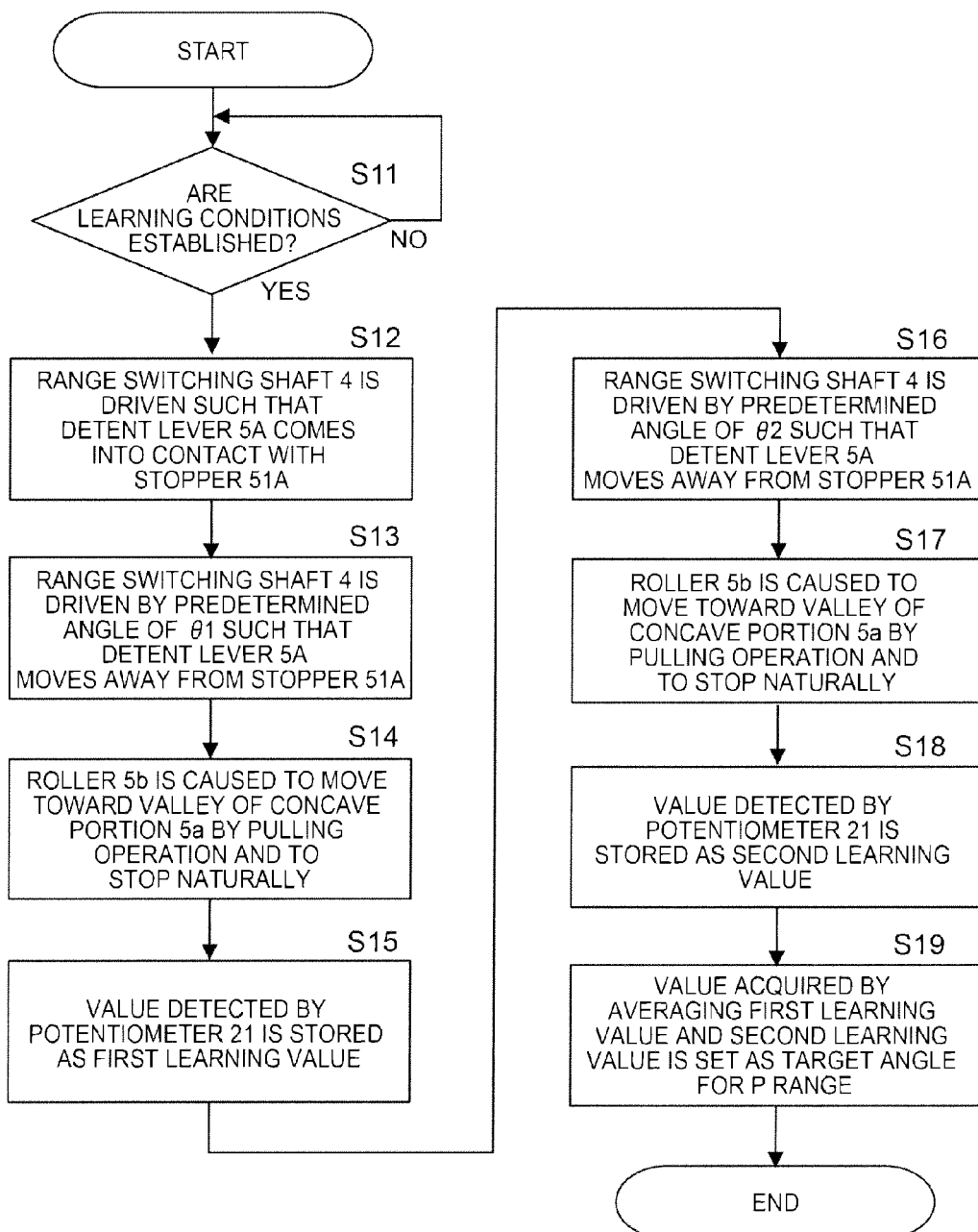
FIG. 3 is a flowchart illustrating control of learning a P range position.

In the flowchart illustrated in FIG. 3, in step 11, it is determined whether learning conditions are established. The learning conditions are set in such a way that learning is performed at the time that the vehicle is stopped in which the traveling of the vehicle is not affected by the learning. The learning conditions preferably include a condition that a parking brake is in operation in addition to a vehicle stop condition. Learning may be performed before the product is shipped from a factory (which is included as the learning conditions).

When the learning conditions are established, the process proceeds to step 12 and the subsequent step, and learning is performed. Hereinbelow, a case, in which a position (target angle for the P range) corresponding to the P range is learned, and set, will be described.

Figure 4A:
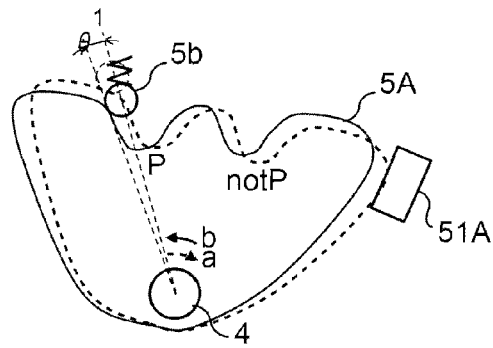
FIG. 4 illustrates the motion of the range switching shaft and a peripheral portion when the P range position is learned.

In step 12, range switching shaft 4 is driven such that detent lever 5A rotates from a current position (the P range position) toward stopper 51A on one side, and detent lever 5A comes into contact with stopper 51A (refer to the dotted line in FIG. 4A).

The position of stopper 51A is set in such a way that pawl 10a of parking pole 10 meshes with concave portion 11a of parking gear 11, and the fixing (parking lock) of parking gear 11 is maintained also in a state where detent lever 5A is in contact with stopper 51A. Accordingly, a first learning value (to be described later) is capable of being acquired at the time that the vehicle is stopped in which the parking lock is maintained.

In step 13, range switching shaft 4 is driven by a predetermined angle of θ1 from the position (limit position) at which detent lever 5A is in contact with stopper 51A such that detent lever 5A moves away from stopper 51A. Accordingly, roller 5b of detent spring 5B reaches a position at which roller 5b moves up one wall (which is located on a side opposite to stopper 51A) of concave portion 5a (corresponding to the P range) from the valley of concave portion 5a by a predetermined amount (refer to the solid line in FIG. 4A).

Figure 4B:
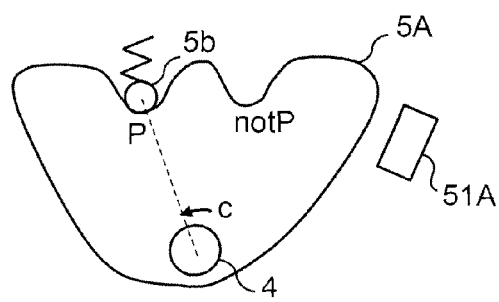

In step 14, the driving of range switching shaft 4 is stopped. Accordingly, a pulling operation of detent mechanism 5 due to an elastic biasing force of detent spring 5B causes roller 5b to move toward the valley of concave portion 5a from the position at which roller 5b moves up the one wall on the side opposite to stopper 51A, and to naturally stop (refer to FIG. 4B).

That is, the predetermined angle of θ1 is set to be in an effective range in which the pulling operation is capable of being activated when range switching shaft 4 is driven by the predetermined angle of θ1, and is stopped.

In step 15, when roller 5b is caused to move toward the valley of concave portion 5a from the one wall of concave portion 5a away from stopper 51A, and to naturally stop, the angle of range switching shaft 4, which is detected by potentiometer 21, is stored as the first learning value of the position (target angle for the P range) corresponding to the P range.

Figure 4C:
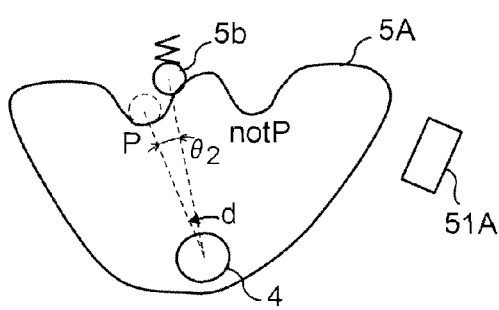

Subsequently, in step 16, from this state, range switching shaft 4 is driven by a predetermined angle of θ2 such that detent lever 5A moves away from stopper 51A. Accordingly, roller 5b reaches a position at which roller 5b moves up the other wall (which is close to stopper 51A) of concave portion 5a (corresponding to the P range) from the valley of concave portion 5a by a predetermined amount (refer to FIG. 4C).

Figure 4D:
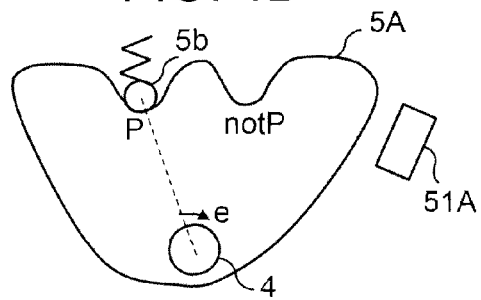

In step 17, the driving of range switching shaft 4 is stopped. Accordingly, a pulling operation of detent mechanism 5 due to an elastic biasing force of detent spring 5B causes roller 5b to move toward the valley of concave portion 5a from the position at which roller 5b moves up the other wall close to stopper 51A, and to naturally stop (refer to FIG. 4D).

That is, the predetermined angle of θ2 is set to be in an effective range in which the pulling operation is capable of being activated when range switching shaft 4 is driven by the predetermined angle of θ2, and is stopped.

The predetermined angle of θ2 is desirably set in such a way that pawl 10a of parking pole 10 meshes with concave portion 11a of parking gear 11, and the fixing (parking lock) of parking gear 11 is maintained also when range switching shaft 4 is driven by the predetermined angle of θ2 such that detent lever 5A moves away from stopper 51A, and a second learning value (to be described later) is desirably acquired at the time that the vehicle is stopped which is more stable.

In step 18, as described above, the angle of range switching shaft 4, which is detected by potentiometer 21 when roller 5b is caused to move toward the valley of concave portion 5a from the one wall of concave portion 5a close to stopper 51A, and to naturally stop, is stored as the second learning value of the target angle for the P range.

In step 19, the learned target angle for the P range is determined based on the first learning value and the second learning value. For example, a value acquired by averaging the first learning value and the second learning value is set as the target angle for the P range.

When a position (target angle) corresponding to a transmission range is learned, the predetermined angle of θ1 is set as an angle from the reference position, in which detent lever 5A is in contact with stopper 51A, to the position in which an pulling operation is activated, and thus the predetermined angle of θ1 is capable of being accurately set, and the angle of deviation between the first learning value acquired by the pulling operation and a true target angle is capable of being reduced.

Accordingly, the first learning value may be simply set as a learning value of the final target angle. In particular, in a case where potentiometer 21 is provided to directly detect the angle of range switching shaft 4, a highly accurate learning value is capable of being acquired without being affected by the amount of play formed on a power transmission path from motor 2 to detent lever 5A.

In contrast, as in the embodiment, when the second learning value is acquired by the pulling operation that is activated in a direction opposite to a direction in which the first learning value is acquired, a position (target angle) corresponding to the P range is capable of being more accurately set based on the two learning acquired by the pulling operations which are activated in the different directions.

As described above, the predetermined amount of play is formed on a power transmission path between motor 2 and the range switching shaft that is positioned at an angle corresponding to each range by the detent mechanism. Typically, in many cases, potentiometer 21 is attached to an output shaft of motor 2. In this case, the angle of range switching shaft 4 detected when range switching shaft 4 rotate in a direction has a value which is greater by the amount of play than that when the amount of play is not formed, and the angle of range switching shaft 4 detected when range switching shaft 4 rotates in the opposite direction has a value which is smaller by the amount of play than that when the amount of play is not formed.

Figure 5:
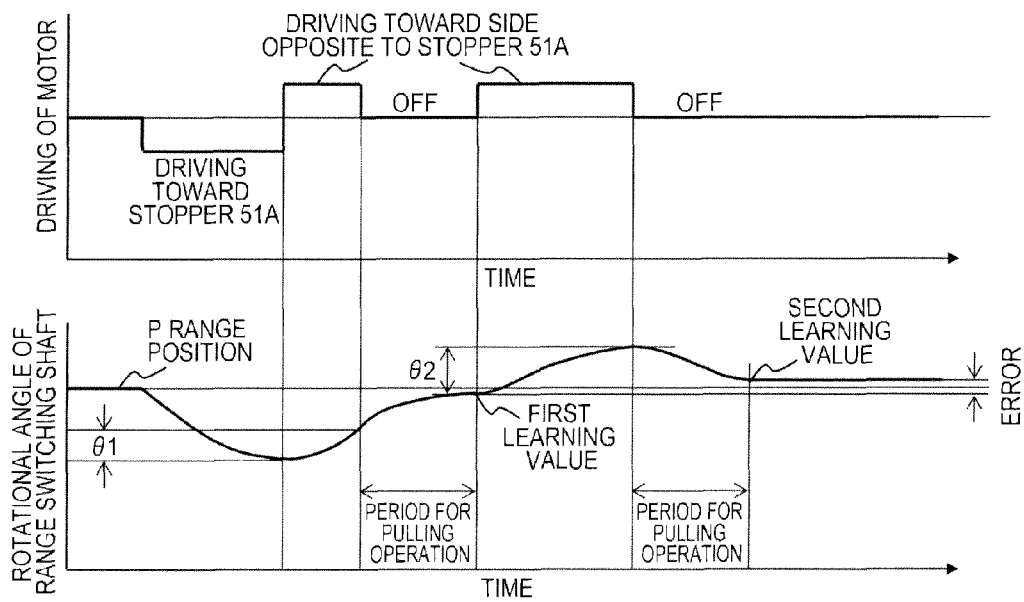
FIG. 5 is a timing chart for the control of learning the P range position.

Accordingly, for example, as illustrated by the timing chart in FIG. 5, when a value smaller by the amount of play is detected as the first learning value that is acquired by the pulling operation activated at a side close to stopper 51A, and a value greater by the amount of play is detected as the second learning value that is acquired by the pulling operation activated at a side opposite to stopper 51A, the first learning value and the second learning value are averaged, and thus the effects of the amount of play is capable of being cancelled out, and a highly accurate target angle is capable of being set.

A friction force when roller 5b moves toward the valley of concave portion 5a is generated in a direction opposite to the movement direction. For this reason, due to the effect of the friction force, when moving toward the valley from the one wall of concave portion 5a on the side close to stopper 51A, roller 5b stops close to stopper 51A compared to when a friction force is not generated, and when moving toward the valley from the side opposite to stopper 51A, roller 5b stops separately from stopper 51A compared to when a friction force is not generated.

As a result, the effect of the friction force can be cancelled out by averaging the first learning value and the second learning value, and thus it is possible to set the target angle with higher precision.

A method, in which the position of the valley of a concave portion is obtained by calculating the angular velocity or the angular acceleration of a detected angular value, is disclosed, and in this case, a high-function CPU is required to accurately compute angular velocity and angular acceleration. In contrast, in the embodiment, such a complicated computation is not required, and the position of a transmission range is capable of being set with high accuracy using a relatively low-cost CPU.

The positioning accuracy and the responsiveness of range switching control are capable of being improved by learning the rotational angle position (target angle) of range switching shaft 4 corresponding to a transmission range with high accuracy.

Figure 6:
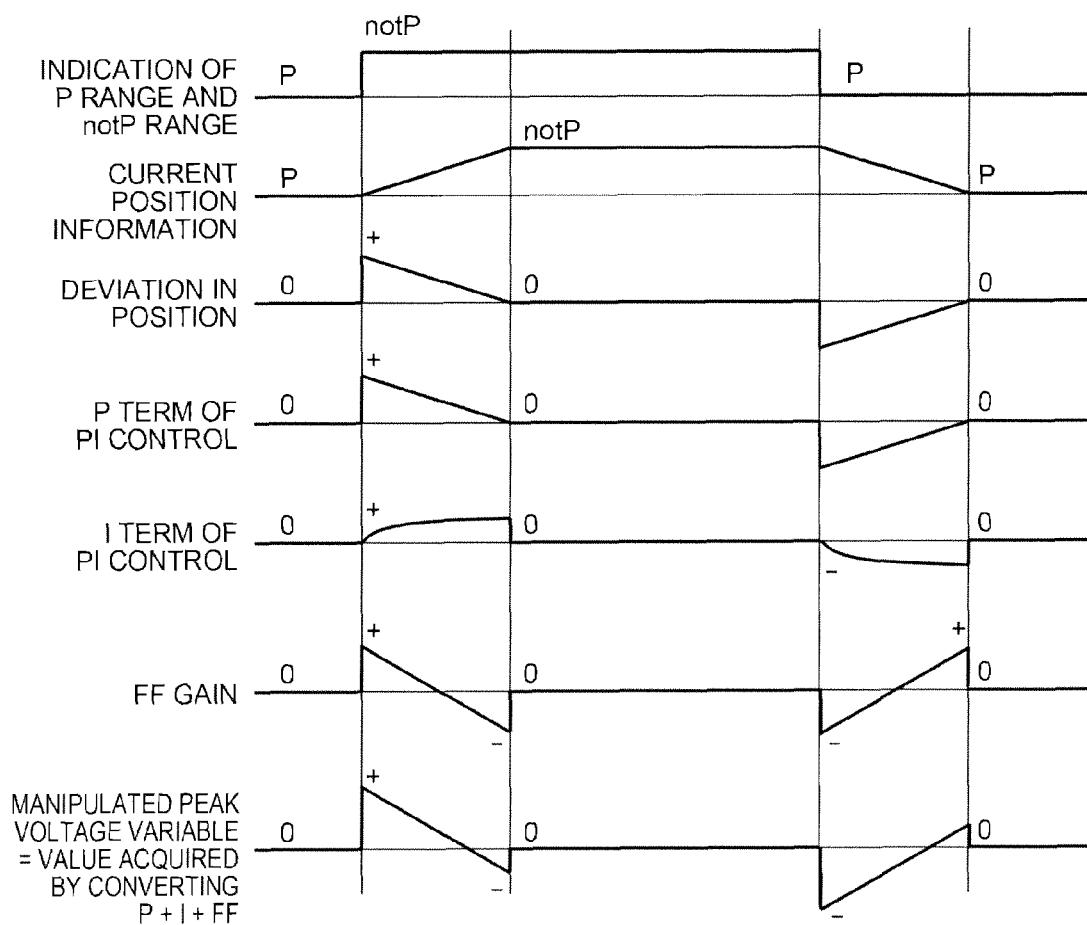
FIG. 6 is a timing chart illustrating a change in each value when the control of shift between a P range and a not P range is performed.

FIG. 6 illustrates a timing chart when the control of shift from the P range to another range (not P range) and then from the not P range to the P range is performed.

In the embodiment, motor 2 uses three-phase alternating current into which direct current from the battery is converted by a three-phase inverter, and a PWM duty to be output to the three-phase inverter is calculated and controlled from a peak voltage (absolute value) to control motor 2. A manipulated peak voltage variable VPEAK is set to a positive value in a rotational direction when the position of range switching shaft 4 is switched from the P range to the not P range, and the manipulated peak voltage variable VPEAK is set to a negative value in a rotational direction in which the position of range switching shaft 4 is switched from the not P range to the P range.

When a command is received to switch a range to the not P range, a P term and an I term of PI control are set according to the deviation between a current position (actual angle) of range switching shaft 4 detected by potentiometer 21 and the not P range position after the range is switched.

A feed forward gain (FF gain) is set according to the current position of range switching shaft 4. The FF gain has a characteristic of gradually decreasing from a predetermined positive value corresponding to the P range position to a predetermined negative value corresponding to the not P range position.

A value, which is the sum of the P term, the I term, and the FF gain, is converted to be set as the manipulated peak voltage variable VPEAK. Accordingly, as illustrated, in a later phase of each range switching, the manipulated variable is set to apply a braking force in a rotational direction opposite to a rotational direction during the range switching, and thereafter, a manipulation force is set to 0, and thus a pulling operation after the stopping of the drive is capable of restricting roller 5b from overshooting the position of the valley of concave portion 5a, and the roller 5b is capable of being positioned in the transmission range after switching.

Since the position (the rotational angle of range switching shaft 4) of range switching shaft 4 corresponding to a transmission range is learned and corrected through the aforementioned control, roller 5b is capable of being quickly and highly accurately positioned (the roller is positioned at the valley of a concave portion) at a range position after switching, based on the corrected position (target angle) corresponding to the range and the current position of range switching shaft 4 detected by potentiometer 21.

In addition to the P range position, the not P range position is capable of being learned.

Figure 7:
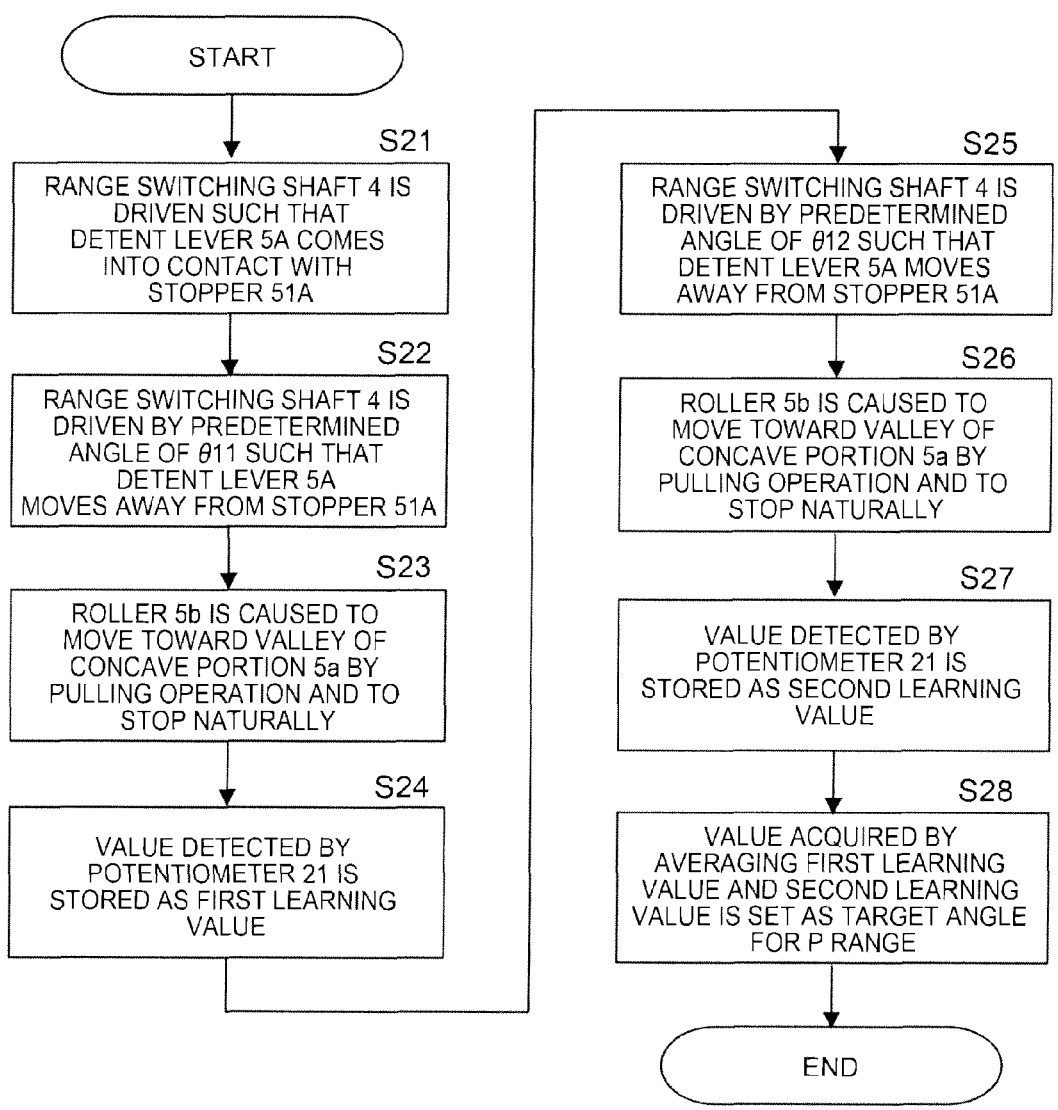
FIG. 7 is a timing chart for control of learning a not P range position.

Hereinafter, a case, in which the not P range position is learned after the learning of the P range position illustrated in FIG. 3 is completed, will be described with reference to the flowchart in FIG. 7, and after it is newly determined when learning conditions are established, the learning of the not P range position may be independently performed, for example, a range to be learned may be changed at every occasion that the vehicle is stopped.

When a plurality of the not P ranges is learned, the not P ranges may be sequentially learned starting from an adjacent not P range, and hereinafter, a case in which the not P range adjacent to the P range is learned will be described.

The learning establishment conditions for the learning of the not P range position preferably include a condition that the parking brake is in operation because stable vehicle stop can be ensured.

In step 21, range switching shaft 4 is driven such that detent lever 5A rotates from the current P range position toward stopper 51A, and detent lever 5A comes into contact with stopper 51A.

In step 22, range switching shaft 4 is driven by a predetermined angle of θ11 from the position at which detent lever 5A is in contact with stopper 51A such that detent lever 5A moves away from stopper 51A. Accordingly, roller 5b of detent spring 5B reaches a position at which roller 5b moves up one wall (which is located on a side opposite to stopper 51A) of concave portion 5a (corresponding to the not P range) from the valley of concave portion 5a by a predetermined amount.

In step 23, the driving of range switching shaft 4 is stopped. Accordingly, a pulling operation of detent mechanism 5 due to an elastic biasing force of detent spring 5B causes roller 5b to move toward the valley of concave portion 5a corresponding to the not P range from the position at which roller 5b moves up the one wall on the side opposite to stopper 51A, and to naturally stop.

That is, the predetermined angle of θ11 is set to be in an effective range in which the pulling operation is capable of being activated when range switching shaft 4 is driven by the predetermined angle of θ11, and is stopped.

In step 24, when roller 5b is caused to move toward the valley of concave portion 5a from the one wall of concave portion 5a away from stopper 51A, and to naturally stop, the angle of range switching shaft 4, which is detected by potentiometer 21, is stored as the first learning value of the position (target angle for the not P range) corresponding to the not P range.

Subsequently, in step 25, from this state, range switching shaft 4 is driven by a predetermined angle of θ12 such that detent lever 5A moves away from stopper 51A. Accordingly, roller 5b reaches a position at which roller 5b moves up the other wall (which is close to stopper 51A) of concave portion 5a (corresponding to the not P range) from the valley of concave portion 5a by a predetermined amount.

In step 26, the driving of range switching shaft 4 is stopped. Accordingly, a pulling operation of detent mechanism 5 due to an elastic biasing force of detent spring 5B causes roller 5b to move toward the valley of concave portion 5a from the position at which roller 5b moves up the other wall close to stopper 51A, and to naturally stop.

That is, the predetermined angle of θ12 is set to be in an effective range in which the pulling operation is capable of being activated when range switching shaft 4 is driven by the predetermined angle of θ12, and is stopped.

In step 27, as described above, when roller 5b is caused to move toward the valley of concave portion 5a from the one wall of concave portion 5a close to stopper 51A, and to naturally stop, the angle of range switching shaft 4, which is detected by potentiometer 21, is stored as the second learning value of the target angle for the not P range.

In step 28, the learned target angle for the not P range is determined based on the first learning value and the second learning value. For example, a value acquired by averaging the first learning value and the second learning value is set as the target angle for the not P range.

Accordingly, also when the not P range position is learned, the predetermined angles of θ11 and θ12 from the reference position, in which detent lever 5A is in contact with stopper 51A, to the position in which an pulling operation is activated are capable of being accurately set, and the angle of deviation between the first learning value and the position (true target angle) of the valley of detent mechanism 5, and the angle of deviation between the second learning value and the position (true target angle) of the valley of detent mechanism 5 are capable of being reduced. Similarly, the effect of the amount of play and the effect of a friction force are capable of being cancelled out, and a learned value (true target position), which is highly accurately learned for the position of the valley, is capable of being set by averaging the first learning value and the second learning value.

In the learning of the not P range position, predetermined angles of θ11' and θ12' from the P range position, which is set as a reference position after the learning is completed, to the positions in which the pulling operations are activated for the not P range position may be set, and range switching shaft 4 may be driven by the predetermined angles of θ11' and θ12'. Accordingly, detent lever 5A is not required to come into contact with stopper 51A, and an amount of time for learning is capable of being reduced.

When roller 5b is caused to move toward the not P range position farther away from the P range position of the plurality of not P range positions, detent lever 5A comes into contact with stopper 51B opposite to stopper 51A, so that the amount of drive to a position at which the pulling operation is activated may be small. In this case, preferably, range switching shaft 4 is driven from a position (limit position), at which detent lever 5A comes into contact with stopper 51B, to the position at which the pulling operation is activated for the not P range, and learning is performed.

The reason for this is that the amount of the driving of range switching shaft 4 to a position at which the pulling operation is activated, is reduced, so that an amount of time for learning can be reduced, and furthermore, an error associated with the amount of drive is reduced, so that learning accuracy is increased.

When a learning value corresponding to a range position, a value detected during learning, or the like is abnormal, preferably, it is determined that there is a possibility that an abnormality occurs, the driving of motor 2 is stopped, and an warning is output.

The position in which roller 5b is caused to stop naturally by a pulling operation, changes due to a change in the magnitude of friction of the motor, the reduction mechanism, or the like which is induced by a change in the temperature of lubricant, the temperature of coolant, or the like. The set values of the predetermined angles of θ1, θ2, θ11, θ12, θ11', and θ12' may be changed and set according to the temperature of lubricant, the temperature of coolant, or the like such that the natural stop position becomes as close as possible to the position of the valley of the concave portion.

REFERENCE SYMBOL LIST

1 Automatic transmission
2 Motor (actuator)
3 Reduction mechanism
4 Range switching shaft
5 Detent mechanism
5a Concave portion
5b Roller
6 Range switching valve
21 Potentiometer
22 Inhibitor switch
23 Range selector switch
24 A/T control unit
51A, 51B Stopper

The invention claimed is:

1. A device for switching a range of an automatic transmission comprising:
   an actuator;
   a detent mechanism which is structured to be driven by the actuator, and engageable with a concave portion formed at a position corresponding to a transmission range to be positioned, so that the detent mechanism changes the transmission range; and
   a control unit configured to set a first position of the detent mechanism as a first target value for a position corresponding to a first transmission range, the first position of the detent mechanism being detected when the detent mechanism is driven to a limit position of a movement range of the detent mechanism, is driven by a first predetermined amount so as to move away from the limit position, moves toward a valley of a first concave portion without being driven by the actuator, and then stops naturally, and which, when setting a second target value for a position corresponding to a second transmission range which is different from the first transmission range of which the first position is completely set, sets a second position of the detent mechanism as the second target value for the position corresponding to the second transmission range, the second position of the detent mechanism being detected when the detent mechanism is driven by a second predetermined amount so as to move away from the first target value for the first transmission range, the first position of which is completely set, moves toward a valley of a second concave portion corresponding to the second transmission range without being driven by the actuator, and then stops naturally.

2. The device for switching the range of the automatic transmission according to claim 1,
   wherein the first predetermined amount is specified from the limit position, and is set based on an effective range in which an operation of pulling the detent mechanism toward the concave portion is capable of being activated.

3. The device for switching the range of the automatic transmission according to claim 1,
   wherein a predetermined amount of play is formed on a power transmission path between the actuator and the detent mechanism.

4. The device for switching the range of the automatic transmission according to claim 1,
   wherein the control unit learns positions of the detent mechanism when the detent mechanism moves toward the valley of the first concave portion in different directions and stops naturally, and sets the first target value based on the results of learning.

5. The device for switching the range of the automatic transmission according to claim 4,
   wherein the control unit sets the first target value by averaging the results of learning.

6. The device for switching the range of the automatic transmission according to claim 1,
   wherein the control unit sets the first target value when a vehicle with the automatic transmission is stopped.

7. The device for switching the range of the automatic transmission according to claim 6, further comprising:
   a mechanism that activates a parking lock when the first transmission range is set to a P range,
   wherein the control unit sets the first target value for a position corresponding to the P range in a state where the activation of the parking lock is in effect.

8. The device for switching the range of the automatic transmission according to claim 1,
   wherein the movement range of the detent mechanism is limited by a pair of limit positions which are set in different movement directions, and
   wherein the control unit drives the detent mechanism to the pair of limit positions, and sets the target value for a position corresponding to a plurality of the transmission ranges.

9. A method for switching a range of an automatic transmission, by which a detent mechanism is structured to be driven by an actuator, and engageable with a concave portion formed at a position corresponding to a transmission range to be positioned, so that the transmission range is changed, the method comprising:
   driving the detent mechanism to a limit position of a movement range of the detent mechanism, and driving the detent mechanism by a first predetermined amount so that the detent mechanism moves away from the limit position;
   setting a first position of the detent mechanism as a first target value for a position corresponding to a first transmission range, the first position of the detent mechanism being detected when the detent mechanism moves toward a valley of a first concave portion without being driven by the actuator, and stops naturally; and when setting a second target value for a position corresponding to a second transmission range which is different from the first transmission range of which the first position is completely set, setting a second position of the detent mechanism as the second target value for the position corresponding to the second transmission range, the second position of the detent mechanism being detected when the detent mechanism is driven by a second predetermined amount so as to move away from the first target value for the first transmission range, the first position of which is completely set, moves toward a valley of a second concave portion corresponding to the second transmission range without being driven by the actuator, and then stops naturally.

10. The method for switching the range of the automatic transmission according to claim 9, wherein positions of the detent mechanism when the detent mechanism moves toward the valley of the first concave portion in different directions and stops naturally, are learned, and the first target value is set based on the results of learning.

11. The method for switching the range of the automatic transmission according to claim 10, wherein the first target value is set by averaging the results of learning.

12. The method for switching the range of the automatic transmission according to claim 9, wherein the first target value is set when a vehicle with the automatic transmission is stopped.

13. The method for switching the range of the automatic transmission according to claim 9, wherein the movement range of the detent mechanism is limited by a pair of limit positions which are set in different movement directions, and wherein the detent mechanism is driven to the pair of limit positions, and target values for positions corresponding to a plurality of the transmission ranges are set.

* * * * *